(12) United States Patent
Muhe-Sturm et al.

(10) Patent No.: US 9,096,176 B2
(45) Date of Patent: Aug. 4, 2015

(54) STEP PROFILE FOR A RESCUE VEHICLE, IN PARTICULAR FOR A FIRE FIGHTING VEHICLE

(71) Applicant: Iveco Magirus AG, Ulm (DE)

(72) Inventors: Frank Muhe-Sturm, Neu-Ulm (DE); Jens Kraemer, Ulm/Donau (DE)

(73) Assignee: Iveco Magirus AG, Ulm (DE)

( * ) Notice: Subject to any disclaimer, the term of this patent is extended or adjusted under 35 U.S.C. 154(b) by 0 days.

(21) Appl. No.: 14/225,174

(22) Filed: Mar. 25, 2014

(65) Prior Publication Data

US 2014/0291957 A1 Oct. 2, 2014

(30) Foreign Application Priority Data

Mar. 27, 2013 (EP) ..................................... 13161366

(51) Int. Cl.
*B60R 3/00* (2006.01)
*A62C 27/00* (2006.01)
*B60Q 1/32* (2006.01)
*F21S 4/00* (2006.01)
*B60Q 1/26* (2006.01)

(52) U.S. Cl.
CPC . *B60R 3/00* (2013.01); *A62C 27/00* (2013.01); *B60Q 1/2661* (2013.01); *B60Q 1/323* (2013.01); *F21S 4/008* (2013.01)

(58) Field of Classification Search
CPC .................................. B60R 3/00; B60R 3/002
USPC .................... 280/163, 164.1, 164.2, 166, 169
See application file for complete search history.

(56) References Cited

U.S. PATENT DOCUMENTS

| | | | | |
|---|---|---|---|---|
| 4,557,494 A | * | 12/1985 | Elwell | 362/495 |
| 5,430,627 A | * | 7/1995 | Nagano | 362/146 |
| 5,915,830 A | * | 6/1999 | Dickson et al. | 362/495 |
| 6,190,027 B1 | * | 2/2001 | Lekson | 362/495 |
| 6,709,137 B1 | * | 3/2004 | Glovak et al. | 362/495 |
| D546,259 S | * | 7/2007 | Metros et al. | D12/203 |
| 2005/0012295 A1 | * | 1/2005 | Chevalier et al. | 280/163 |
| 2007/0290475 A1 | | 12/2007 | Reitinger | |

FOREIGN PATENT DOCUMENTS

| | | |
|---|---|---|
| DE | 20315167 | 1/2004 |
| GB | 2324901 | 4/1998 |

* cited by examiner

*Primary Examiner* — John Walters
(74) *Attorney, Agent, or Firm* — Stetina Brunda Garred & Brucker

(57) ABSTRACT

Step profile (100) for a rescue vehicle, in particular for a fire fighting vehicle, comprising an extruded profile body (10) with a mainly rectangular cross section and a mainly flat upper step surface (12), characterized in that the cross section of the profile body (10) comprises a first groove (20) opening towards the upper side of the profile body (10) in which a first band-shaped lighting device (32) is arranged, a second groove (42) opening towards the bottom side of the profile body (10) in which a second band-shaped lighting device (46) is arranged, and a cross section portion (50) for engaging with a fixing means for fixing the step profile (100) to a vehicle body.

5 Claims, 1 Drawing Sheet

STEP PROFILE FOR A RESCUE VEHICLE, IN PARTICULAR FOR A FIRE FIGHTING VEHICLE

CROSS REFERENCE TO RELATED APPLICATIONS

The present application claims priority to European Patent Application No. 13161366.3 filed Mar. 27, 2013.

STATEMENT RE: FEDERALLY SPONSORED RESEARCH/DEVELOPMENT

Not Applicable.

BACKGROUND OF THE INVENTION

The present invention relates to a step profile for a rescue vehicle, in particular for a fire fighting vehicle, according to the preamble of claim 1.

Rescue vehicles of all kind must provide a good accessibility of all of their parts and components. In particular it is necessary to enter the vehicle easily. In many types of constructions it is also necessary to climb onto the top of the vehicle, i. e. to enter a deck that is located on the vehicle top. For example, fire fighting vehicles that are equipped with turn table ladders comprise a walk on their super structure on which the operator of the ladder reaches the main operator seat of the turret of the ladder. The access to this walk is provided by comfortable main steps in the front part of the vehicle.

However, it is necessary to equip the vehicle with different axis points, in case the main steps are blocked. For this reason the rear part of the vehicle is equipped with an emergency step constructed like a ladder that follows the present standard requirements in view of its dimensions, anti-slip requirements, etc.

Like all other parts of a rescue vehicle, in particular a fire fighting vehicle, a step profile for a ladder forming a part of such a vehicle must have a consistent and durable design with a good connectivity to other engaging parts of the vehicle. In recent years profile systems have been developed to form many vehicle parts in a modular fashion, and a ladder step of the above kind could form one element in this modular system that must be compatible with other elements. Moreover, new developments in lighting technology allow the use of integrated illumination systems that are integrated within construction components. It is desired to integrate such an illumination system also in a vehicle ladder. In this respect it is necessary to make the contour of the ladder step visible by an integrated illumination function, but also to illuminate the ground beneath the ladder by a suitable lighting system. However, it must be kept in mind to keep the costs of the ladder system low and to reduce the number of necessary components for realizing the new features.

SUMMARY OF THE INVENTION

It is therefore an object of the present invention to provide a step profile of the above kind that can easily be integrated into a modular system and provides new features in view of an integrated illumination of the step contour and the surrounding environment of the ladder without causing extensive production and mounting costs.

This object can be achieved by a step profile comprising the features of claim 1.

The cross section of the extruded profile body of the step profile according to the present invention comprises a first groove that opens towards the upper side of the profile body, and a second groove that opens to the opposite direction, i. e. towards the bottom side. Within the first (upper) groove, a first band-shaped lighting device is arranged to illuminate the upper step surface and make the upper step contour visible even under poor visibility conditions. This band-shaped lighting device can be imagined as an illuminated band provided with lighting sources of a suitable technology, for example, formed by a number of LEDs arranged next to each other to form the band. This arrangement is compact enough to be integrated into the first groove.

Within the second groove at the bottom side of the profile body, a second band-shaped lighting device is arranged that may be of the same kind as the first lighting device as described above. This second band-shaped lighting device serves to illuminate the environment below the step profile. Finally, there is a cross section portion for engaging with a fixing means for fixing the step profile to a vehicle body. Typically the vehicle body will be equipped with protruding engaging means that protrude into the ends of this cross section at both sides of the ladder.

While the integration of the first and second band-shaped lighting devices into their respective groove openings realizes new illumination features, the provision of a cross section portion makes it possible to integrate the step profile into a modular system. The general construction of this step profile is cost saving and simple, keeping the number of parts as low as necessary. All standard requirements of rescue ladders can be fulfilled, including the anti-slip upper step surface of the step.

According to one embodiment of the present invention, at least one of the first and second band-shaped lighting devices is a lighting bar that is fixed within the respective first or second groove. Such a lighting bar can be made of a plastic material and fixed within an extruded profile body made of metal. Within the lighting bar, the illumination sources can be arranged together with electric supply cables, etc.

According to another preferred embodiment of the present invention, the upper surface of the lighting bar that is fixed within the first groove flushes with the upper step surface. This means that the upper step surface is still flat without the lighting bar protruding on top. Instead the lighting bar is rather integrated into the upper surface.

Preferably a first groove is arranged in the center portion of the upper step surface, while the second groove is offset towards a back portion of the profile body that faces the vehicle body. This embodiment provides a staggered arrangement of the first and second groove, with the first groove running in the center of the upper step surface and the second groove being offset towards the vehicle body.

More preferably, a cross section portion for engaging with a fixing means comprises a third groove opening towards the bottom side of the profile body, and said third groove is offset towards a front portion of the profile body opposite to the back portion.

BRIEF DESCRIPTION OF THE DRAWINGS

These and other aspects of the present invention will be apparent from and elucidated with reference to the embodiments described hereinafter.

DETAILED DESCRIPTION OF THE INVENTION

Figure 1:
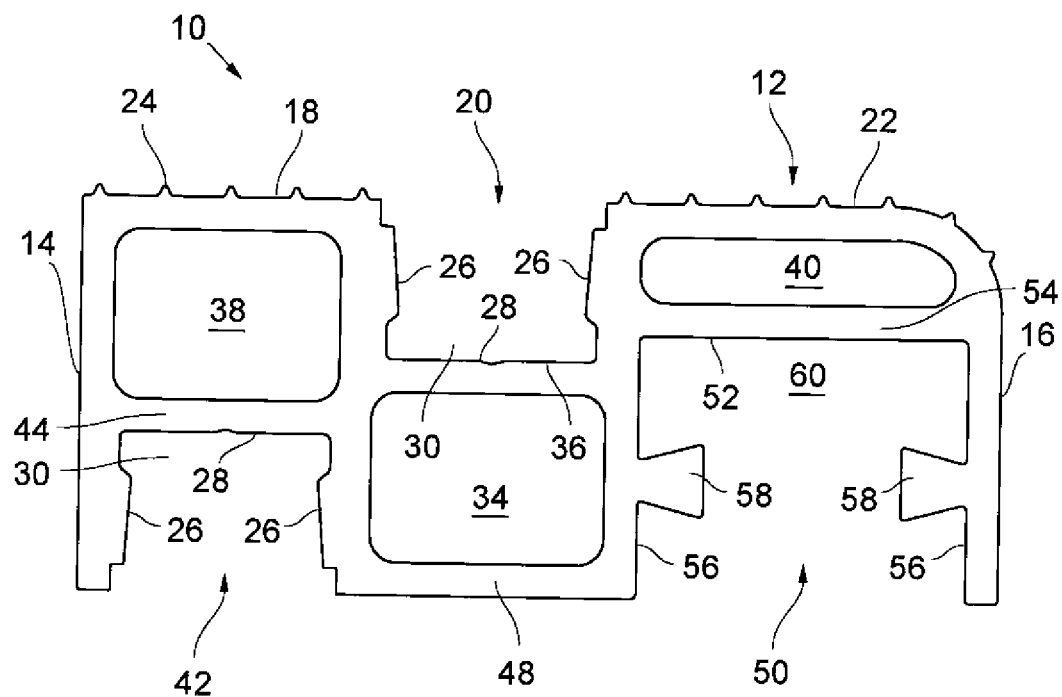
FIG. 1 is a schematic cross section through the profile body of an embodiment of a step profile according to the present invention.
Figure 2:
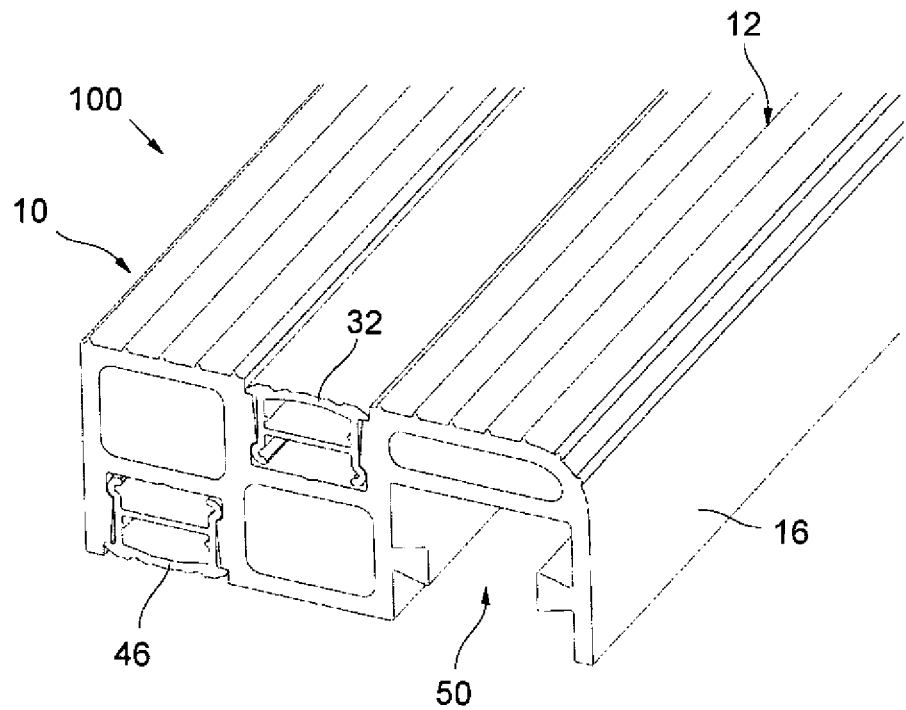
FIG. 2 is a perspective view of the step profile according to the embodiment shown in FIG. 1.

FIG. 1 shows a cross section through an extruded profile body 10 of a step profile as a part of a ladder of a rescue vehicle, in particular for a fire fighting vehicle. It is noted in this context that the step profile explained with respect to FIGS. 1 and 2 is not only suitable for forming a ladder for rescue vehicles but can also be used in a different field, for example, with other utility vehicles. However, the inventive features of the present step profile make it especially useful for rescue vehicles, in particular with the illumination features as described hereinafter.

The profile body 10 in FIG. 1 is made of metal, in particular of aluminum. It has a substantially rectangular cross section, with a substantially flat upper step surface 12 and vertical walls 14,16 at opposite sides. It is noted that in FIG. 1, the left vertical wall 14 represents the back side of the profile body 10 that faces the vehicle body (not shown), while the opposite front wall 16 represents the free side of the step at the front portion.

The upper step surface 12 is provided with ridges 18 as an anti-slip means. These ridges 18 run in the longitudinal direction of the profile body, i. e. they are visible in the cross section in FIG. 1. In the center of the upper step surface 12, a first groove 20 is provided that divides the upper step surface 12 into a front portion 22 and a back portion 24. The first groove 20 has a substantially rectangular cross section with side walls 26 that constrict towards the flat bottom 28 of the first groove 20. At its bottom 28, the first groove 20 is provided with an undercut 30.

The first groove 20 is provided to receive a first band-shaped lighting device, such as a lighting bar in form of a hollow profile of a transparent or translucent plastic material that contains a number of lighting means along the bar. In FIG. 2, such a lighting bar 32 is shown that is arranged within the first groove 20 such that its upper surface flushes with the upper step surface 12 of the profile body 10. When illuminated, the lighting bar 32 exactly shows the position and orientation of the upper step surface 12. It is clear from the above that the arrangement of the lighting bar 32 within the first groove 20 provides an integration of a lighting means for showing the position of the step profile, also illuminating the environment above the upper step surface 12.

Below the first groove 20, a hollow channel 34 with a rectangular cross section is arranged within the profile body 10. This central channel 34 stabilizes the profile body 10 and is separated from the first groove 20 by a horizontal wall portion 36. Another channel 38 of this kind is arranged between the first groove 20 and the vertical back wall 14, below the back portion 24 of the upper step surface 12. A flat hollow channel 40 is arranged on the opposite side of the profile body 10 below the front portion 22 of the upper step surface 12, next to the first groove 20.

A second groove that opens towards the bottom of the profile is arranged within the profile body 10 below the hollow channel 38 between the back wall 14 and the central hollow channel 34. This second groove 42 has the same cross section as the first groove 20. Inclined side walls 26 constrict towards the bottom 28 of this second groove 42 (which is formed by the bottom surface of the horizontal wall 44 separating the second groove 42 from the hollow channel 38). There is also an undercut 30 at the bottom 28 of this second groove 42. This second groove 42 is provided to accommodate a second band-shaped lighting device in form of a lighting bar 46 (see FIG. 2) that is pressed into the second groove 42 from below. This second lighting bar 46 may have the same shape and function as the first lighting bar 32, i. e. comprising a number of illumination means for illuminating the environmental space below the step profile 100 at its back portion. The first and second lighting bars 32,46 fixed within their respective grooves 20,42 by pressing or a snap-fit mechanism, without further need of screws or any other additional fixing means. However, any suitable fixing means can be used by the skilled man for fixing the lighting bars 32,46 into the grooves 20,42. The bottom of the second lighting bar 46 flushes with the bottom of the profile body 10, i. e. with the bottom wall 48 of the central hollow channel 34.

Within the front portion of the profile body 10, below the flat hollow channel 40 and next to the central hollow channel 34, a third groove 50 is provided that has a mainly rectangular cross section that is larger and in particular deeper than the cross section of the second groove 42. The third groove has a flat bottom 52 (formed by the horizontal bottom wall 54 of the flat hollow channel 40) and vertical wall portions 56. On these vertical wall portions 56, dovetail ridges 58 extend towards the free inner portion of the third groove 50 so that an undercut 60 is formed between the dovetail ridges 58 and the bottom 52 of third groove 50. The third groove 50 is opened towards the bottom of the step profile 100.

This third groove 50 is provided for engaging with a fixing means (not shown) of the vehicle body that may extend from the end of the step profile 100 in its longitudinal direction into the third groove 50. By this fixing engagement, the step profile 100 cannot be lifted or drawn out of its position at the vehicle body. The rectangular cross section of the third groove 50, including the dovetail ridges 58, may be a feature of a modular construction system with pre-defined engaging means to engage into the ends of the third groove 50, as explained above. With this shape of the third groove 50, the step profile 100 according to this embodiment of the present invention fits into a modular system for construction a rescue vehicle.

Because the second groove 42 is offset with respect to the first groove 20 towards the back portion of the profile body 10, and the third groove 50 being offset into the opposite direction, i. e. towards the front portion of the profile body 10, the depth of the grooves can be adapted in the way that they do not depend on each other. It can be seen from FIG. 1 that the third groove 50 has a great depth with a bottom 52 being positioned higher than the bottom 28 of the first groove 20, without interfering with each other.

What is claimed is:

1. Step profile (100) for a rescue vehicle, in particular for a fire fighting vehicle, comprising an extruded profile body (10) with a mainly rectangular cross section and a mainly flat upper step surface (12), said profile body (10) comprising a first groove (20) and a second groove (42), a first and a second band-shaped lighting device (32) being arranged respectively in said first and second grooves (20,42), said first groove (20) opening towards an upper side of the profile body (10), said second groove (42) opening towards a bottom side of the profile body (10), said step profile (100) comprising a third groove (50) opening towards a bottom side of the profile body (10) and offset towards a front portion of the profile body (10) opposite to the back portion.

2. Step profile according to claim 1, characterized in that at least one of the first and second band-shaped lighting devices (32,46) is a lighting bar that is fixed within the respective first or second groove (20,42).

3. Step profile (100) for a rescue vehicle, in particular for a fire fighting vehicle, comprising an extruded profile body (10)

with a mainly rectangular cross section and a mainly flat upper step surface (12), said profile body (10) comprising a first groove (20) and a second groove (42), a first and a second band-shaped lighting device (32) being arranged respectively in said first and second grooves (20,42), said first groove (20) opening towards an upper side of the profile body (10), said second groove (42) opening towards a bottom side of the profile body (10), the first groove (20) being arranged in a center portion of the upper step surface (12), the second groove (42) being offset towards a back portion of the profile body (10) that faces the vehicle body, the upper surface of the lighting bar (32) being fixed within the first groove (20) flushing with an upper step surface (12).

4. Step profile (100) according to claim 3, characterized in that said step profile comprises a third groove (50) opening towards a bottom side of the profile body (10) and being offset towards a front portion of the profile body (10) opposite to the back portion.

5. Step profile (100) according to claim 3 or 4, characterized in that at least one of the first and second band-shaped lighting devices (32,46) is a lighting bar that is fixed within the respective first or second groove (20,42).

* * * * *